(12) United States Patent
Li

(10) Patent No.: US 12,452,100 B2
(45) Date of Patent: Oct. 21, 2025

(54) METHOD FOR ACHIEVING NETWORK COMMUNICATION BASED ON NEIGHBOR NEGOTIATION AND DEVICE

(71) Applicant: ZTE Corporation, Shenzhen (CN)

(72) Inventor: Jiuming Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 802 days.

(21) Appl. No.: 17/622,763

(22) PCT Filed: Jun. 1, 2020

(86) PCT No.: PCT/CN2020/093797
§ 371 (c)(1),
(2) Date: Dec. 24, 2021

(87) PCT Pub. No.: WO2021/012799
PCT Pub. Date: Jan. 28, 2021

(65) Prior Publication Data
US 2022/0255806 A1    Aug. 11, 2022

(30) Foreign Application Priority Data

Jul. 24, 2019  (CN) .......................... 201910669031.9

(51) Int. Cl.
*H04L 12/46*  (2006.01)
*H04L 12/28*  (2006.01)
*H04L 69/324* (2022.01)

(52) U.S. Cl.
CPC .......... *H04L 12/4633* (2013.01); *H04L 12/28* (2013.01); *H04L 69/324* (2013.01)

(58) Field of Classification Search
None
See application file for complete search history.

(56) References Cited

U.S. PATENT DOCUMENTS

2006/0239298 A1   10/2006  Townsley et al.
2011/0177780 A1    7/2011  Sato et al.
(Continued)

FOREIGN PATENT DOCUMENTS

| CN | 102130707 A | 7/2011 |
| CN | 103731285 A | 4/2014 |
| CN | 103795518 A | 5/2014 |
| CN | 104066135 A | 9/2014 |

(Continued)

OTHER PUBLICATIONS

European Patent Office. Extended European Search Report for EP Application No. 20844747.4, mailed Jul. 28, 2022, pp. 1-10.
(Continued)

*Primary Examiner* — Srinivasa R Reddivalam
(74) *Attorney, Agent, or Firm* — Vivacqua Crane, PLLC

(57) ABSTRACT

A method and an apparatus for achieving network intercommunication based on neighbor negotiation are disclosed. The method may include: switching a link mode from a first mode to a second mode; sending, to a to-be-connected device, a switching request for switching from the second mode to the first mode; and switching the second mode back to the first mode in response to receiving a response sent by the to-be-connected device, the response being used to indicate that the to-be-connected device is to be switched to the first mode.

7 Claims, 3 Drawing Sheets

(56) References Cited

U.S. PATENT DOCUMENTS

| | | | |
|---|---|---|---|
| 2016/0323164 A1* | 11/2016 | Cao | H04L 69/12 709/224 |
| 2017/0005901 A1 | 1/2017 | Gareau | |
| 2018/0013511 A1 | 1/2018 | Hussain et al. | |
| 2018/0167160 A1* | 6/2018 | Gareau | H04L 41/00 714/766 |
| 2019/0319829 A1* | 10/2019 | Li | H04L 41/0893 |
| 2020/0067827 A1* | 2/2020 | Mei | H04L 69/14 370/392 |
| 2020/0162586 A1* | 5/2020 | Li | H04L 69/08 370/466 |
| 2020/0259580 A1* | 8/2020 | Zhong | H04W 72/04 370/468 |
| 2020/0259754 A1* | 8/2020 | Chen | H04L 49/351 |
| 2021/0076111 A1* | 3/2021 | Shew | H04W 40/34 |
| 2021/0152898 A1* | 5/2021 | Li | H04B 10/27 398/58 |
| 2021/0409236 A1* | 12/2021 | Hu | H04L 12/28 |
| 2024/0040018 A1* | 2/2024 | Li | H04L 69/24 |

FOREIGN PATENT DOCUMENTS

| | | | |
|---|---|---|---|
| CN | 108631873 A | * 10/2018 | ............ H04B 10/27 |
| CN | 110290439 A | 9/2019 | |
| WO | 2018120914 A1 | 7/2018 | |

OTHER PUBLICATIONS

The State Intellectual Property Office of People's Republic of China. First Office Action for CN Application No. 201910669031.9 and English translation, mailed Aug. 9, 2022, pp. 1-13.

The State Intellectual Property Office of People's Republic of China. First Search Report for CN Application No. 201910669031.9 and English translation, mailed Aug. 1, 2022, pp. 1-5.

International Searching Authority. International Search Report and Written Opinion for PCT Application No. PCT/CN2020/093797 and English translation, mailed Aug. 26, 2020, pp. 1-12.

European Patent Office. Communication pursuant to Article 94(3) EPC for EP Application No. 20844747.4, mailed Jan. 23, 2025, pp. 1-9.

* cited by examiner

METHOD FOR ACHIEVING NETWORK COMMUNICATION BASED ON NEIGHBOR NEGOTIATION AND DEVICE

CROSS-REFERENCE TO RELATED APPLICATIONS

This application is a national stage filing under 35 U.S.C. § 371 of international application number PCT/CN2020/093797, filed Jun. 1, 2020, which claims priority to Chinese patent application No. 201910669031.9, filed Jul. 24, 2019. The contents of these applications are incorporated herein by reference in their entirety.

TECHNICAL FIELD

The present disclosure relates to the field of communication, and more particularly, to a method and an apparatus for achieving network intercommunication based on neighbor negotiation.

BACKGROUND

A Data Communication Network (DCN) is a management channel for bearer devices and provides communication between a network management system and network elements. Generally, a bearer device can form an ad-hoc network with layer 3 IPv4 traffic forwarding capability after being connected to optical fibers and powered on, to carry traffic of the network management system.

In the related technology, as defined in OIF FlexE10.0, a flexible Ethernet (FlexE) port can operate only after hierarchical port configuration. Compared with a packet port, it is an improvement on a port of a physical layer and on encapsulation of service messages on the physical layer. Therefore, when a FlexE bearer device is connected to a traditional Ethernet (ETH) bearer device, or when the ETH bearer device is upgraded to the FlexE bearer device, direct intercommunication fails due to a configuration sequence and some network elements are disconnected.

SUMMARY

According to embodiments of the present disclosure, a method and an apparatus for achieving network intercommunication based on neighbor negotiation are provided.

The method for achieving network intercommunication based on neighbor negotiation according to the embodiments of the present disclosure includes: switching a link mode from a first mode to a second mode; sending, to a to-be-connected device, a switching request for switching from the second mode to the first mode; and switching the second mode back to the first mode in response to a response sent by the to-be-connected device being received, the response being used to indicate that the to-be-connected device is to be switched to the first mode.

According to the embodiments of the present disclosure, a method for achieving network intercommunication based on neighbor negotiation is further provided, including:
receiving a switching request for switching from a second mode to a first mode sent by a connected device; sending a response, which indicates that the first mode is to be switched to, to the connected device in response to receiving the switching request; and switching a link mode from the second mode to the first mode.

According to the embodiments of the present disclosure, an apparatus for achieving network intercommunication based on neighbor negotiation is further provided, including:
a first mode switching unit configured to switch a link mode from a first mode to a second mode; and a request sending unit configured to send, to a to-be-connected device, a switching request for switching from the second mode to the first mode; the first mode switching unit being further configured to switch the second mode back to the first mode in response to a response sent by the to-be-connected device being received, the response being used to indicate that the to-be-connected device is to be switched to the first mode.

According to the embodiments of the present disclosure, an apparatus for achieving network intercommunication based on neighbor negotiation is further provided, including:
a request receiving unit configured to receive a switching request for switching from a second mode to a first mode sent by a connected device; a request response unit configured to send a response, which indicates that the first mode has been switched to, to the connected device in response to receiving the switching request; and a second mode switching unit configured to switch a link mode from the second mode to the first mode.

According to the embodiments of the present disclosure, a non-transitory computer-readable storage medium storing a program for achieving information transmission is further provided, where the program, when executed by a processor, causes the processor to perform the method for achieving network intercommunication based on neighbor negotiation as described above.

According to the embodiments of the present disclosure, one-key intercommunication of newly-connected devices from one side of an existing network can be quickly implemented, solving the problem in the existing technology that two types of network bearer devices cannot communicate with each other during connection due to mismatch.

The above description is only a summary of the technical schemes of the present disclosure. In order to be able to understand the technical means of the present disclosure more clearly, the technical means can be implemented according to the contents of the description. Furthermore, to make the above and other objectives, features and advantages of the present disclosure more comprehensible, specific embodiments of the present disclosure are descried as follows.

BRIEF DESCRIPTION OF DRAWINGS

By reading detailed descriptions of the following preferred implementations, those having ordinary skill in the art may understand various other advantages and benefits. The accompanying drawings are merely intended to show objectives of the preferred implementations, and should not be considered as a limitation on the present disclosure. In addition, like reference numerals indicate like components throughout the accompanying drawings, in which.

DETAILED DESCRIPTION

Embodiments of the present disclosure will be described below in more detail with reference to the accompanying drawings. Although the embodiments of the present disclosure are illustrated in the accompanying drawings, it is to be understood that the present disclosure may be implemented in various forms and should not be limited by the embodiments described herein. Conversely, the embodiments are provided to make the present disclosure more comprehensively understood, and to completely convey the scope of the present disclosure to those having ordinary skills in the art.

According to an embodiment of the present disclosure, a method for achieving network intercommunication based on neighbor negotiation is provided. The method may be applied to the side of a connected device, which is a device that has been connected to a communication network. The method may be applied to cases where a link mode of a network of a to-be-connected device (a device to be connected to the communication network) and a link mode of a network of a device in the communication network (a connected device) do not support intercommunication.

Figure 1:
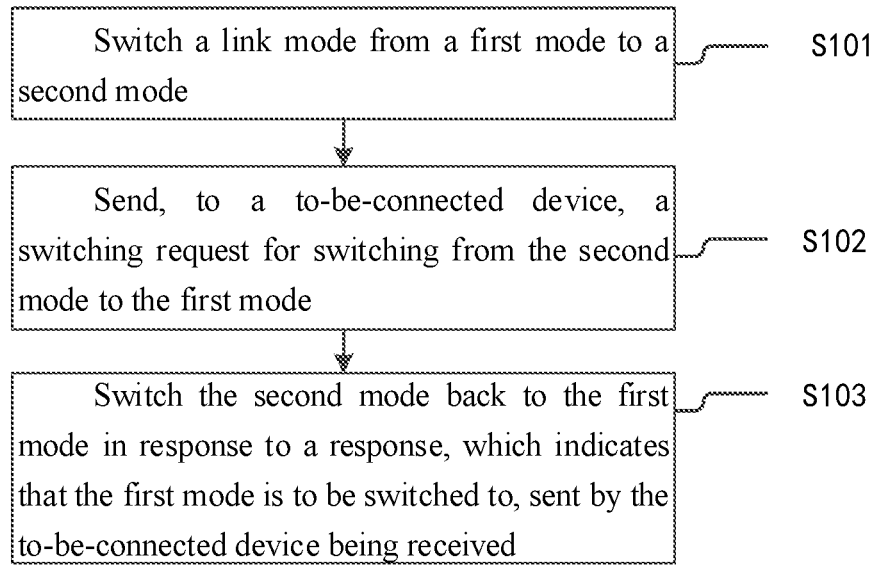
FIG. 1 is a flowchart (I) of a method for achieving network intercommunication based on neighbor negotiation according to an embodiment of the present disclosure.

FIG. 1 is a flowchart (I) of a method for achieving network intercommunication based on neighbor negotiation according to an embodiment of the present disclosure. As shown in FIG. 1, the method may include following steps of S101, S102 and S103.

At S101, a link mode is switched from a first mode to a second mode.

It is to be noted here that the first mode and the second mode are two different network modes. For example, in some examples of the present disclosure, one of the first mode and the second mode may be a traditional ETH link mode, and the other may be a FlexE link mode.

At S102, a switching request for switching from the second mode to the first mode is sent to a to-be-connected device.

At S103, the second mode is switched back to the first mode after a response, which indicates that the first mode is to be switched to, sent by the to-be-connected device is received.

It is to be noted that "the first mode is to be switched to" mentioned here may be understood as that the to-be-connected device has completed all preparations for switching to the first mode. The to-be-connected device can switch the link mode from the second mode to the first mode at any time after the response is sent.

According to the embodiment of the present disclosure, through negotiation between a connected device and a to-be-connected device, network intercommunication between the to-be-connected device (not communicating with the connected device) and the connected device can be implemented in a simple manner with high efficiency.

On the basis of the above embodiment, various modified embodiments are further proposed. It is to be noted herein that, for brief description, only differences from the above embodiment are described in the modified embodiments.

In order to improve network security, according to some embodiments of the present disclosure, the method further includes:

switching the second mode back to the first mode when the link mode is switched to the second mode for more than a preset time.

According to some embodiments of the present disclosure, sending a switching request for switching from the second mode to the first mode to a to-be-connected device may include:

periodically sending an extended Link Layer Discovery Protocol (LLDP) request message to the to-be-connected device, the extended LLDP request message carrying the switching request.

Thus, the extended LLDP request message may be used to carry the switching request, so as to simplify the sending of the switching request. Moreover, since the extended LLDP request message is sent periodically, there is no need for strict control over the timeliness of switching from the link mode from the first mode to the second mode, and the extended LLDP request message can reach the to-be-connected device when sent in the second mode at least once, so that the probability of failure in sending the switching request can be effectively reduced.

Further, receiving a response, which indicates that the first mode is to be switched to, sent by the to-be-connected device may be receiving an extended LLDP response message sent by the to-be-connected device, the extended LLDP response message carrying the response, which indicates that the to-be-connected device is to be switched to the first mode.

According to an embodiment of the present disclosure, a method for achieving network intercommunication based on neighbor negotiation is further provided. The method may be applied to the side of a to-be-connected device, which is a device to be connected to a communication network. The method may be applied to cases where a link mode of a network of a to-be-connected device and a link mode of a network of a device in the communication network (a connected device) do not support intercommunication.

Figure 2:
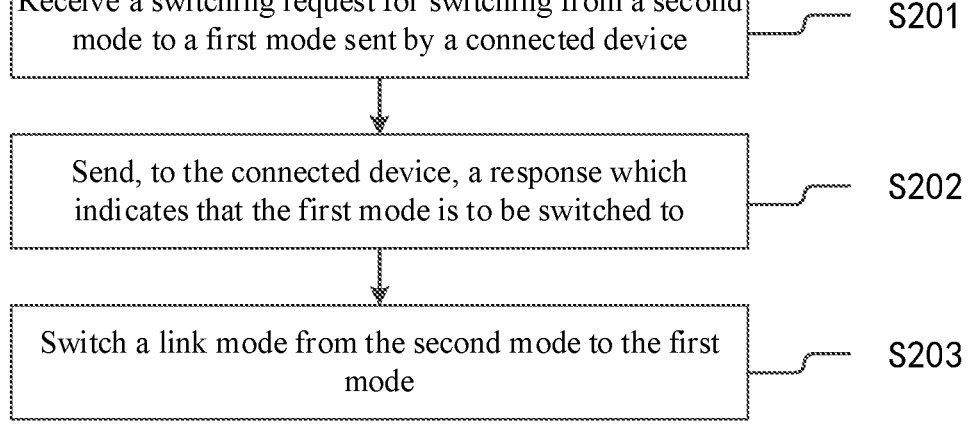
FIG. 2 is a flowchart (II) of the method for achieving network intercommunication based on neighbor negotiation according to an embodiment of the present disclosure.

FIG. 2 is a flowchart (II) of a method for achieving network intercommunication based on neighbor negotiation according to an embodiment of the present disclosure. As shown in FIG. 2, the method may include following steps of S201, S202 and S203.

At S201, a switching request for switching from a second mode to a first mode sent by a connected device is received.

At S202, a response which indicates that the first mode is to be switched to is sent to the connected device upon receiving the switching request.

It is to be noted that "the first mode is to be switched to" mentioned here may be understood as that the to-be-connected device has completed all preparations for switching to the first mode. The to-be-connected device can switch the link mode from the second mode to the first mode at any time after the response is sent.

At S203, a link mode is switched from the second mode to the first mode.

According to the embodiment of the present disclosure, through negotiation between a connected device and a to-be-connected device, network intercommunication between the to-be-connected device (not communicating with the connected device) and the connected device can be implemented in a simple manner with high efficiency.

Further, receiving a switching request for switching from a second mode to a first mode sent by a connected device may include:

receiving an extended LLDP request message periodically sent by the connected device; and acquiring the switching request for switching from the second mode to the first mode carried in the extended LLDP request message.

For example, the to-be-connected device may send the received extended LLDP request message to an LLDP protocol module. If the extended LLDP request message contains a switching request of a link mode, an extended LLDP response message carries a response which indicates that the first mode is to be switched to, and is sent to the connected device.

Figure 3:
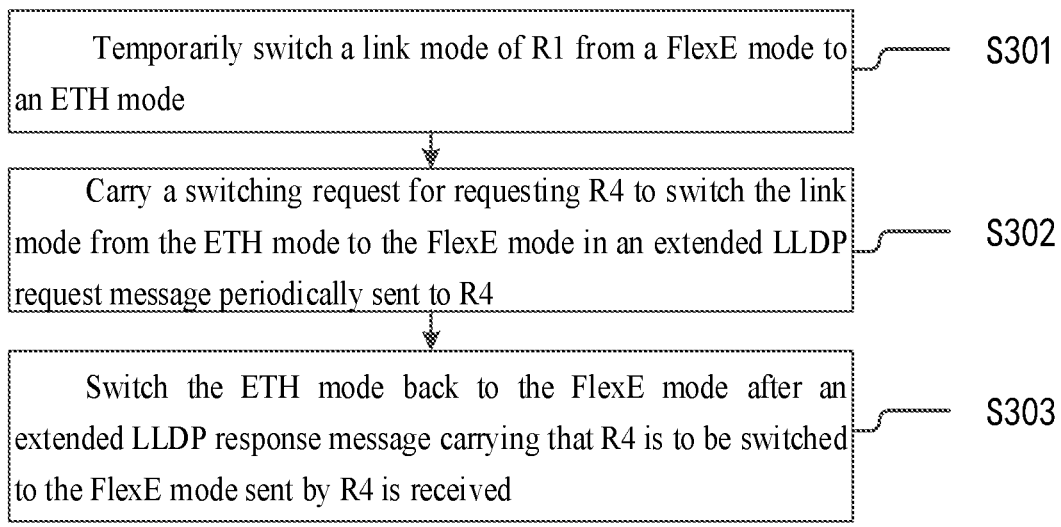
FIG. 3 is a flowchart (III) of the method for achieving network intercommunication based on neighbor negotiation according to an embodiment of the present disclosure.

The method for achieving network intercommunication based on neighbor negotiation according to an embodiment of the present disclosure is described in detail below with a specific embodiment with reference to FIG. 3. It is to be understood that the following description is merely example and is not intended to limit the present disclosure. All similar structures and similar changes thereof according to the present disclosure shall be included in the protection scope of the present disclosure.

Figure 6:
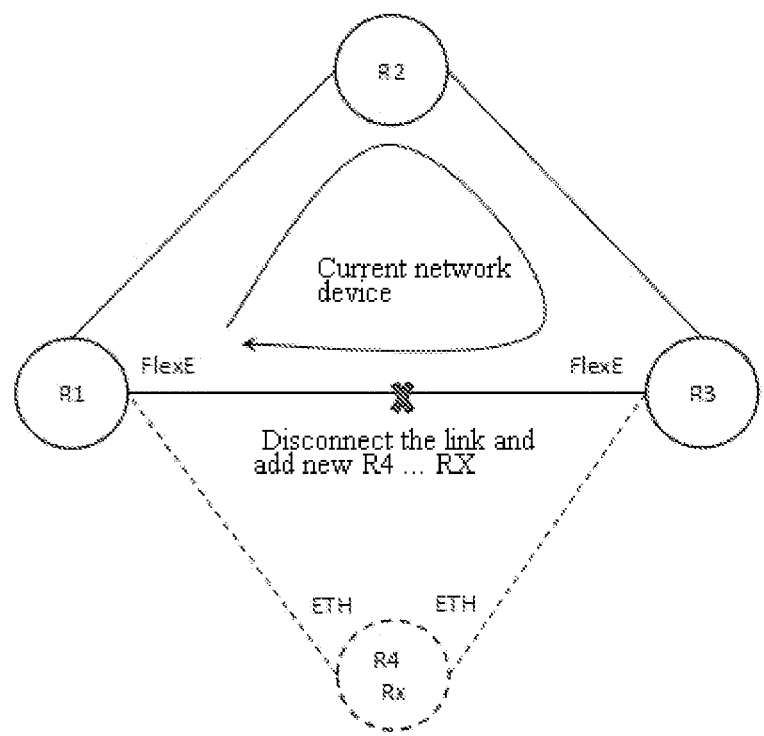
FIG. 6 is a schematic diagram of an application scenario according to an embodiment of the present disclosure.

As shown in FIG. 6, connected devices R1, R2 and R3 are all in a FlexE mode. To-be-connected devices R4, . . . and RX are now to be connected between R1 and R3 in a current network. A link mode of the to-be-connected devices R4, . . . and RX is an ETH mode, and the ETH mode and the FlexE mode do not support direct communication.

On this basis, according to an embodiment of the present disclosure, a method for achieving network intercommunication based on neighbor negotiation is provided on the side of a connected device (such as R1). As shown in FIG. 3, the method includes following steps of S301, S302 and S303.

At S301, a link mode of R1 is temporarily switched from a FlexE mode to an ETH mode.

At S302, a switching request for requesting R4 to switch its link mode from the ETH mode to the FlexE mode is carried in an extended LLDP request message periodically sent to R4.

It is to be noted that, since the extended LLDP request message carrying the switching request is sent periodically, the sequence of SS301 and S302 is not strictly controlled. S301 may be performed prior to S302, or S302 is performed prior to S301.

At S303, the ETH mode is switched back to the FlexE mode after an extended LLDP response message carrying that R4 is to be switched to the FlexE mode sent by R4 is received.

It is to be noted that R4 sends the extended LLDP response message in the ETH mode, which carries that R4 is ready to switch from the ETH mode to the FlexE mode.

Figure 4:
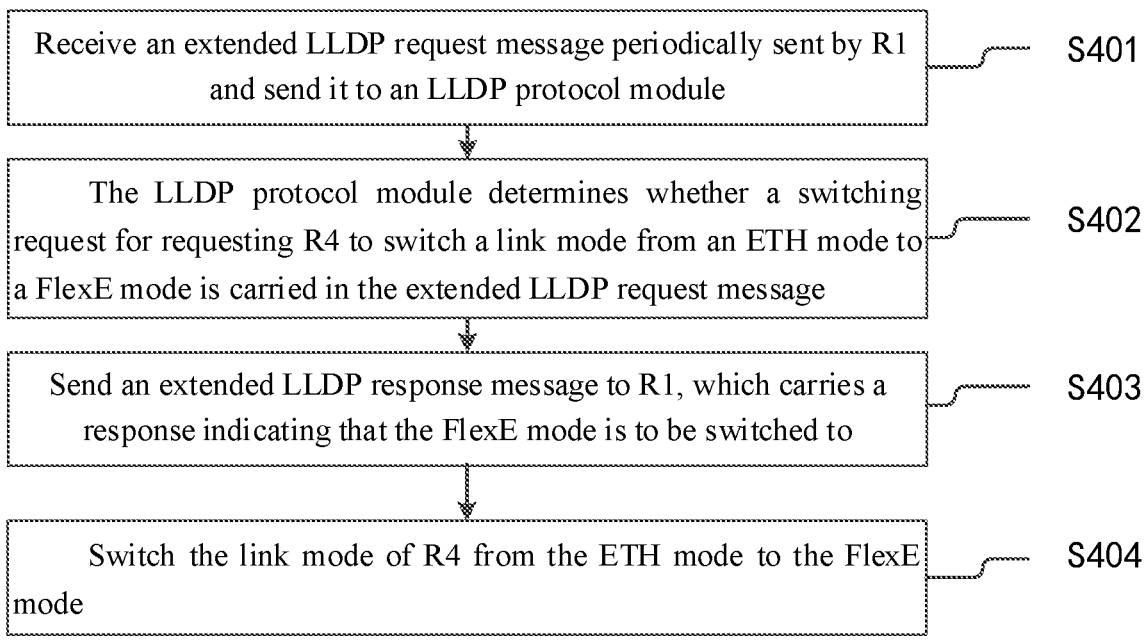
FIG. 4 is a flowchart (IV) of the method for achieving network intercommunication based on neighbor negotiation according to an embodiment of the present disclosure.

According to an embodiment of the present disclosure, a method for achieving network intercommunication based on neighbor negotiation is also provided on the side of a to-be-connected device (such as R4). As shown in FIG. 4, the method includes following steps of S401, S402, S403 and S404.

At S401, an extended LLDP request message periodically sent by R1 is received and sent to an LLDP protocol module.

It is to be noted that the to-be-connected device can receive the extended LLDP request message only when the extended LLDP request message is sent after R1 is switched to an ETH mode even if sent for only once.

At S402, the LLDP protocol module determines whether a switching request for requesting R4 to switch a link mode from an ETH mode to a FlexE mode is carried in the extended LLDP request message.

At S403, if yes, an extended LLDP response message is sent to R1, which carries a response indicating that the FlexE mode is to be switched to, that is, information indicating that R4 is ready to switch to the FlexE mode.

At S404, the link mode of R4 is switched from the ETH mode to the FlexE mode.

It is to be noted that, after the extended LLDP response message is sent to R1, the link mode of R4 can be switched from the ETH mode to the FlexE mode after an interval of t. The method for intercommunicating R3 with Rx as well as any two adjacent devices of R4, . . . and RX may refer to the steps for intercommunicating R1 with R4, until the intercommunication is completed for the entire network topology.

The method for achieving network intercommunication based on neighbor negotiation according to the embodiment of the present disclosure may be used to solve the problem of connection between an ETH bearer network and a FlexE bearer network in the related technology.

It is to be noted that the above are only preferred embodiments of the present disclosure and are not intended to limit the present disclosure. For those having ordinary skills in the art, the present disclosure may have various modifications and variations. Any modifications, equivalent substitutions, improvements and the like made within the principle of the present disclosure should fall within the protection scope of the present disclosure.

According to an embodiment of the present disclosure, an apparatus for achieving network intercommunication based on neighbor negotiation is further provided, including:

a first mode switching unit configured to switch a link mode from a first mode to a second mode; and a request sending unit configured to send, to a to-be-connected device, a switching request for switching from the second mode to the first mode;

the first mode switching unit being further configured to switch the second mode back to the first mode in response to receiving a response of being to be switched to the first mode sent by the to-be-connected device.

According to some examples of the present disclosure, the first mode switching unit is further configured to:

switch the second mode back to the first mode when the link mode is switched to the second mode for more than a preset time.

According to some examples of the present disclosure, the request sending unit is configured to:

periodically send an extended LLDP request message to the to-be-connected device, the extended LLDP request message carrying the switching request.

According to an embodiment of the present disclosure, an apparatus for achieving network intercommunication based on neighbor negotiation is further provided, including:

a request receiving unit configured to receive a switching request for switching from a second mode to a first mode sent by an connected device;

a request response unit configured to send a response, which indicates that the first mode is to be switched to, to the connected device in response to receiving the switching request; and a second mode switching unit configured to switch a link mode from the second mode to the first mode.

Further, the request receiving unit is configured to:

receive an extended LLDP request message periodically sent by the connected device; and acquiring the switching request for switching from the second mode to the first mode carried in the extended LLDP request message.

Figure 5:
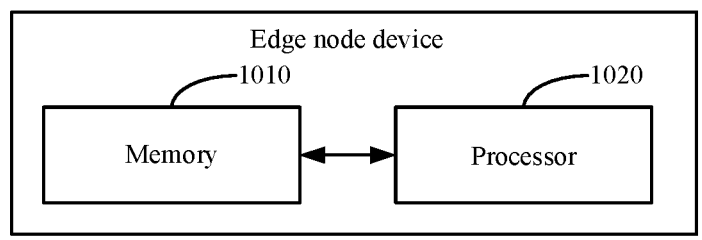
FIG. 5 is a schematic structural diagram of an electronic device according to an embodiment of the present disclosure.

According to an embodiment of the present disclosure, an electronic device is provided, which, as shown in FIG. 5, includes: a memory 1010, a processor 1020 and a computer program stored on the memory 1010 and executable by the processor 1020, which when executed by the processor 1020, cause the processor 1020 to perform the steps of S101, S102 and S103 or steps of S201, S202 and S203.

At S101, a link mode is switched from a first mode to a second mode.

At S102, a switching request for switching from the second mode to the first mode is sent to a to-be-connected device.

At S103, the second mode is switched back to the first mode after a response which indicates that the to-be-connected device has been switched to the first mode is received.

At S201, a switching request for switching from a second mode to a first mode sent by a connected device in the second mode is received.

At S202, a link mode is switched from the second mode to the first mode when the switching request is received.

At S203, a response which indicates that the first mode has been switched to is sent to the connected device, so as to trigger the connection device to switch the second mode back to the first mode.

According to an embodiment of the present disclosure, a non-transitory computer-readable storage medium storing a program for achieving information transmission is further provided. The program, when executed by the processor 1020, causes the processor 1020 to perform steps of S101, S102 and S103 or steps of S201, S202 and S203.

At S101, a link mode is switched from a first mode to a second mode.

At S102, a switching request for switching from the second mode to the first mode is sent to a to-be-connected device.

At S103, the second mode is switched back to the first mode after a response which indicates that the to-be-connected device has been switched to the first mode is received.

At S201, a switching request for switching from a second mode to a first mode sent by a connected device in the second mode is received.

At S202, a link mode is switched from the second mode to the first mode when the switching request is received.

At S203, a response which indicates that the first mode has been switched to is sent to the connected device, so as to trigger the connection device to switch the second mode back to the first mode.

In this embodiment, the non-transitory computer-readable storage medium includes, but is not limited to, a read-only memory (ROM), a random access memory (RAM), a magnetic disc, an optical disc, and the like.

Apparently, those having ordinary skills in the art should understand that the modules or steps in the present disclosure can be implemented using a common computing device, which may be centralized on a single computing device or distributed over a network formed by multiple computing devices. Optionally, they can be implemented using program code executable by the computing device, so that they can be stored in a storage device for execution by the computing device. Besides, in some cases, the steps shown or described can be performed in a different order than here, either by making them into individual integrated circuit modules separately, or by making multiple modules or steps of them into a single integrated circuit module. In this way, the present disclosure is not limited to any combination of particular hardware and software.

It is to be noted that, in the description of the specification, reference terms such as "one embodiment", "some embodiments", "embodiments", "an example", "specific example" and "some examples" mean that a specific feature, structure, material, or characteristic described in connection with the embodiment or example is included in at least one embodiment or example of the present disclosure. In the specification, the schematic expressions to the above terms are not necessarily referring to the same embodiment or example. Besides, the specific feature, structure, material, or characteristic described may be combined in an appropriate manner in any one or more embodiments or examples.

Although embodiments of the present disclosure have been shown and described, those having ordinary skills in the art can understand that changes, modifications, replacements and variations can be made to these embodiments without departing from the scope of the present disclosure, and the scope of the present disclosure is defined by claims and their equivalents.

INDUSTRIAL APPLICABILITY

According to the above technical schemes, one-key communication of newly-connected devices from one side of a current network can be quickly implemented, solving the problem in the existing technology that two types of network bearer devices cannot communicate with each other during connection due to mismatch.

What is claimed is:

1. A method for achieving network intercommunication based on neighbor negotiation, comprising:
   switching a link mode from a first mode to a second mode;
   sending, to a to-be-connected device, a switching request for switching from the second mode to the first mode, comprising:
      periodically sending an extended Link Layer Discovery Protocol (LLDP) request message to the to-be-connected device, the extended LLDP request message being obtained by extending an existing LLDP message to carry the switching request; and
   switching the second mode back to the first mode in response to receiving a response sent by the to-be-connected device, the response being an extended LLDP response message and used to indicate that the to-be-connected device is to be switched to the first mode;
   wherein one of the first mode and the second mode is a traditional Ethernet (ETH) link mode, and the other is a flexible Ethernet (FlexE) link mode.

2. The method of claim 1, further comprising:
   switching the second mode back to the first mode in response to the link mode being switched to the second mode for more than a preset time.

3. A method for achieving network intercommunication based on neighbor negotiation, comprising:
   receiving a switching request for switching from a second mode to a first mode sent by a connected device, comprising:
      receiving an extended Link Layer Discovery Protocol (LLDP) request message periodically sent by the connected device, wherein the extended LLDP request message being obtained by extending an existing LLDP message to carry the switching request; and acquiring the switching request for switching from the second mode to the first mode carried in the extended LLDP request message;

sending a response, which indicates that the first mode is to be switched to, to the connected device in response to receiving the switching request, wherein the response being an extended LLDP response message; and switching a link mode from the second mode to the first mode;

wherein one of the first mode and the second mode is a traditional Ethernet (ETH) link mode, and the other is a flexible Ethernet (FlexE) link mode.

4. An apparatus for achieving network intercommunication based on neighbor negotiation, comprising:

a first mode switching unit configured to switch a link mode from a first mode to a second mode; and a request sending unit configured to send, to a to-be-connected device, a switching request for switching from the second mode to the first mode, comprising:

periodically sending an extended Link Layer Discovery Protocol LLDP) request message to the to-be-connected device, the extended LLDP request message being obtained by extending an existing LLDP message to carry the switching request;

the first mode switching unit being further configured to switch the second mode back to the first mode in response to a response sent by the to-be-connected device being received, the response being an extended LLDP response message and used to indicate that the to-be-connected device is to be switched to the first mode;

wherein one of the first mode and the second mode is a traditional Ethernet (ETH) link mode, and the other is a flexible Ethernet (FlexE) link mode.

5. The apparatus of claim 4, wherein the first mode switching unit is further configured to:

in response to the link mode being switched to the second mode for more than a preset time, switch the second mode back to the first mode.

6. A non-transitory computer-readable storage medium, storing a program for achieving information transmission, which when executed by a processor, causes the processor to perform the method of claim 1.

7. A non-transitory computer-readable storage medium, storing a program for achieving information transmission, which when executed by a processor, causes the processor to perform the method of claim 3.

* * * * *